United States Patent [19]

Kansky

[11] 3,735,213

[45] May 22, 1973

[54] A NONPOROUS VITREOUS BODY FOR SUPPORTING ELECTRONIC DEVICES

[75] Inventor: Evgen Kansky, Ljubljana, Yugoslavia

[73] Assignee: Institut za Elektroniko in Vakuumsko Tehniko, Teslova, Ljubljana, Yugoslavia

[22] Filed: Aug. 10, 1970

[21] Appl. No.: 62,459

[30] Foreign Application Priority Data

Aug. 8, 1969 Yugoslavia........................P 2068/69

[52] U.S. Cl..........317/234 R, 317/234 F, 317/234 G, 317/234 H, 317/235 N, 65/31

[51] Int. Cl...............................H01l 3/00, H01l 5/00

[58] Field of Search.......................317/234, 235, 3.1, 317/4, 4.1, 27, 27.1; 29/588; 65/31

[56] References Cited

UNITED STATES PATENTS

| | | | |
|---|---|---|---|
| 2,629,802 | 2/1953 | Pantchechnikoff | 317/235 |
| 3,254,389 | 6/1966 | Andres et al. | 317/234 |
| 3,341,649 | 9/1967 | James | 317/234 |
| 3,582,300 | 6/1971 | Coombes et al. | 65/31 |
| 3,264,712 | 8/1966 | Hayashi et al. | 29/155.5 |

*Primary Examiner*—John W. Huckert
*Assistant Examiner*—Andrew J. James
*Attorney*—Karl F. Ross

[57] ABSTRACT

A support for electronic circuitry comprises a generally cylindrical metallic frame to which a ground lead is attached and a body of homogeneous glass, ceramic, pyroceram or other vitreous hard homogeneous electrically insulated material filling the frame. Other leads are embedded in the glass layer which has a polished surface at which the leads terminate flush therewith. Circuit elements are applied to the polished surface by vacuum-depositing, sputtering or print-circuit techniques and the entire assembly is closed in a can. The method involves heating a plug of the vitreous material to fill the frame, grinding the surface of the resulting vitreous body and optically polishing same to receive the circuit elements.

2 Claims, 4 Drawing Figures

INVENTOR;
EVGEN KANSKY
BY
Karl F. Ross
ATTORNEY

A NONPOROUS VITREOUS BODY FOR SUPPORTING ELECTRONIC DEVICES

FIELD OF THE INVENTION

The present invention relates to a special support for electronic devices made by vacuum-evaporation techniques, sputtering or screen-printing, whereby the circuits thus made are deposited directly on the upper surface of the insulating substrate of the support.

BACKGROUND OF THE INVENTION

Known supports for electronic elements, particularly for transistors and integrated circuits, have a metal shell (case) shaped like a dish or cup with the bottom up. There are several bores provided in the bottom of the shell for the passage of wires which are hermetically sealed in the supporting dish with the aid of sintered glass. Thereby the wire leads serve as external electrical terminations of the circuit. The ends of these wires protrude a little through the upper surface of the support. In order to manufacture an electrical circuit on the upper surface of the supporting dish between these protruding wire ends, it is necessary first to apply an insulating layer or to manufacture the circuit on a particular substrate totally or partly insulated against the metal support dish. The electrical connection between the wire leads and the single terminations of the micro-circuit must be provided by fine metallic wires. Various other modifications are known as well, but in any case the upper surface of the metal dish could not be used as substrate to which a micro-circuit could be applied by vacuum-deposition, by sputtering or by screen-printing, because it is not possible to obtain a surface smooth enough, or to use masks for vacuum-depositing, sputtering or screen-printing, the reason also being the wire ends hindering the work.

The disadvantages of known supports consist before all in the above-mentioned connecting wires for the connection to wire leads. Effectuating of these connections is time-consuming and, moreover, requires highly specialized equipment for ultra-sonic welding or cold welding with gold. Often these wires can break or provoke variable stray capacitances which effect circuit characteristics.

SUMMARY OF THE INVENTION

The support for electronic devices according to the present invention avoids these disadvantages by vacuum-depositing, sputtering or screen-printing of the connections between wire leads and terminations of the micro-circuit as well as parts of the micro-circuit directly upon the upper surface of the insulating substrate. Parts of the micro-circuit are deposited in one or several layers of more or less conductive segments.

Wire leads are sealed into the metal supporting frame with the aid of homogeneous (continuous or unporous) glass so that this glass creates a glass substrate in the support. The upper surface of the glass substrate is ground and then preferentially optically polished, whereby it is attained that the ends of wire leads are flush with the upper surface of the glass substrate. Then I can vacuum-deposit, sputter or screen-print conductive or insulating segments with the aid of adequately shaped masks adhering to the upper surface of the glass substrate of the support. The number of wire leads, of course, depends upon the kind of circuits manufactured upon the support.

According to the basic idea of the present invention, glass-ceramics (e.g. pyrocerams) or ceramics can be used instead of the usual metal-sealing glass. When using pyrocerams, all working procedures including polishing are the same as in the case of sealing glass, and then the pyroceram is converted into ceramics by known procedures. When, however, ceramics are used as insulating substrate instead of sealing glass, the mechanical fixation and sealing of the leads are achieved by soldering with solders or sealing glass.

According to present invention, the support is manufactured by sealing mutually insulated wire leads into a supporting metal frame, preferably with the aid of carbon or ceramic jigs. First, the grounding lead is welded to the frame, then the frame with this grounding lead is cleaned and placed in the jig, the latter having suitably arranged bores for the other leads which are put into said bores. A cylindrical piece of homogeneous glass is also inserted inbetween the leads. Then the jigs with the frames, leads and pieces of homogeneous glass are heated up in a neutral and extremely pure atmosphere so that the glass is mollified, filling the interior of the frame as allowed by the frame and the jig.

Upon cooling down, the glass hardens creating the glass substrate into which the particular wire leads are fastened. Then the supports are removed from the jig and the metal parts are surface-worked. Finally superfluous glass is removed by grinding whereby the even upper surface of the glass substrate is shaped. Simultaneously the ends of wire leads are made flush with the optically ground upper surface of the glass substrate. Due to the use of homogeneous glass instead of the otherwise usual pellets of sintered glass, a fully smooth surface is obtained by subsequent optical polishing. A fully homogeneous glass substrate cannot be obtained from sintered glass due to numerous fine glass bubbles which leave holes in the polished surface. Thereafter, appropriately shaped circuit segments are deposited on the polished upper surface of the glass substrate. This is accomplished by vacuum-evaporation, sputtering or screen-printing, which are commonly known procedures. The segments represent parts of the microcircuit as well as the connections between the circuit elements and the wire leads. Conductive segments may have a very differing surface resistivity so that in some cases they may represent a good electrical conductor and in other cases an electrical insulator. Some connections may be realized also by connecting wires. If necessary, also active standard elements, such as transistors or diodes, can be inserted in the circuit.

Subsequently, the metal can protecting the circuit against external influences is welded, soldered or adhered in a known manner to the supporting frame.

DESCRIPTION OF THE DRAWING

An embodiment of the support for electronic devices and a method of producing same will now be described in detail with reference to the accompanying drawing, in which.

SPECIFIC DESCRIPTION

Figure 1:
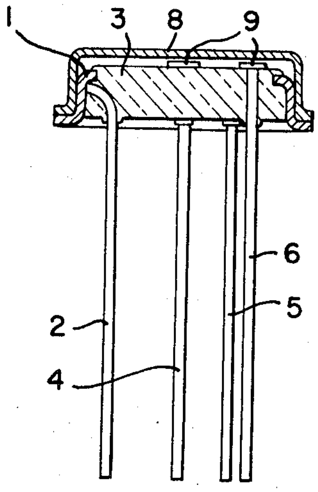
FIG. 1 shows a longitudinal cross-section of the socket and its top can.
Figure 2:
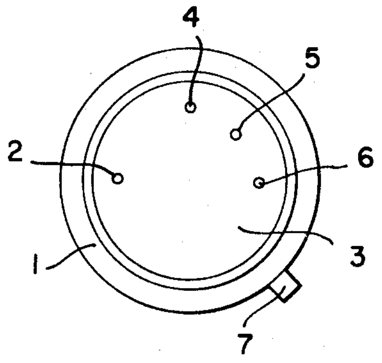
FIG. 2 shows a plan view of the socket without can.

The socket for electronic devices according to FIGS. 1 and 2 comprises a metal frame 1 made of an alloy of cobalt iron and nickel, known under the commercial name "Kovar." The frame 1 of the embodiment described has the size of standard transistor sockets with the international designation TO 5. The ground lead 2 is welded to said frame 1. In the interior of frame 1 there is the glass substrate 3 which is obtained by melting homogeneous "Kovar" glass. Wire leads 4, 5, 6 are sealed into the glass substrate and arranged in the same way as in standard transistor sockets. The leads 4, 5, 6 are thus electrically insulated mutually as well as against the frame 1. The leads 2, 4, 5, 6 are made of the same alloy as the frame. The frame 1 comprises a lug 7 which indicates the position of the wire leads 2, 4, 5, 6. Finally, a can 8 protecting the circuit against damage is welded to the frame 1. Segments 9 are vacuum-deposited on the polished upper surface of the glass substrate 3. The leads and the frame are finished by gold-plating of surfaces protruding from the glass.

Supports according to present invention are manufactured so that a ground lead 2 is welded to frame 1. Then said frame with the lead is degreased by an organic solvent and dried. The frame is then annealed in an atmosphere of wettened hydrogen, preferentially at a temperature of about 900° C, in order to be surface-clean so that glass bubbles do not appear in the glass during glass melting.

Figure 3:
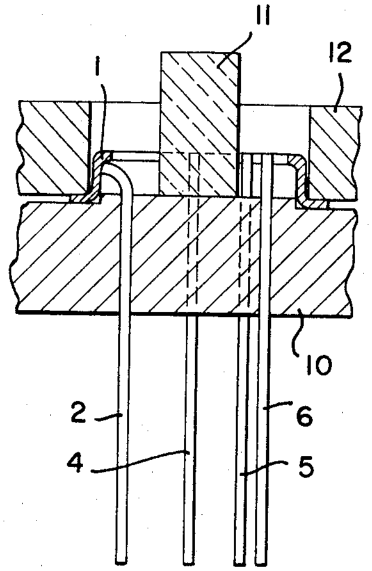
FIG. 3 shows a longitudinal cross-section of the socket before sealing.
Figure 4:
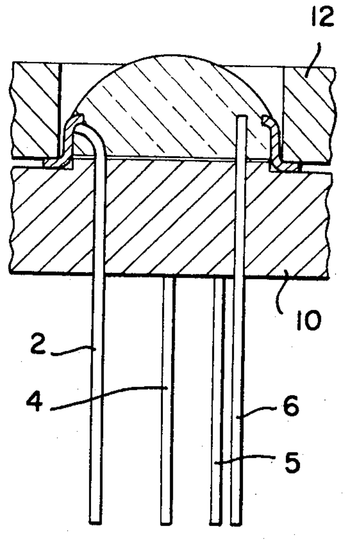
FIG. 4 shows a longitudinal cross-section of the socket after sealing and before grinding of the upper surface of the glass substrate.

Subsequently, the frame 1 with the ground lead 2 is inserted in the lower part of a two-piece jig having bores for wire leads 2, 4, 5, 6 arranged e.g. in accordance with the arrangement of wire leads of a standard transistor socket and a groove into which fits an outwardly turned lower edge of the supporting frame 1 and an orientating lug 7. Wire leads 4, 5, 6, which had previously been cut to required lengths, degreased, annealed under hydrogen and surface-oxidized, are inserted into the bores of the lower part of the jig. A plug 11 of homogeneous glass is inserted between said leads. When using supporting frames 1 having a size corresponding to the standard transistor socket TO 5, correct sealing is effected by glass plugs 11 having a diameter of 4.5 to 5 mm and a length of 7.5 to 8 mm. Then the ring-shaped frames 1 are fastened with the aid of the upper part 12 of the jig, which presses the outwardly turned edges of frames 1 against the lower part 10 of the jig. Therefore the upper jig part 12 must comprise such a number of bores as there are frames to be inserted in a single jig. A part of the jig in a longitudinal cross-section with one inserted frame, leads and a glass plug is shown in FIG. 3. Subsequently, the jig with frames, glass plugs and leads inserted is heated up under an atmosphere of extremely pure nitrogen for 20 to 30 minutes at a temperature of 950° to 1050° C so that the glass is melted filling up the interior of frames 1. When cooling down, the glass becomes hard, forming the glass substrate by which the leads 2, 4, 5, 6 are fixed. FIG. 4 shows a part of the jig in a longitudinal cross-section after the leads had been sealed into the frame by homogeneous glass. As soon as the glass is hardened again and cooled down, the supports are removed from the jig 10, 12 and surface-worked. First, the oxide layer is removed by etching and the surface enriched by galvanic gold-plating. Finally, superfluous glass is removed by grinding so that the ends of wire leads 4, 5, 6 are flush with the ground upper surface of the glass substrate 3, whereby the supports are adhered by a gluing resin to the grinding and polishing plate so that the lower outwardly turned edge of the supporting frame is bonded to the optical even upper surface of the grinding plate, which has bores into which reach the wire leads 2, 4, 5, 6. The grinding is performed by the known method of glass grinding with the aid of 4 to 6 grades of granulosity of the grinding means. At grinding, the ends of wire leads are ground simultaneously with the glass. Fine grinding is followed by optical polishing by a known method and with known polishing means, e.g. cerium or zirconium oxide on hart-felt or resin. After polishing, the supports are unglued from the plate by an organic solvent, e.g. perchloroethylene, many times washed by the said solvent and then placed into adequate holders and with the aid of ultra-sonics cleaned in three to six cleaning solutions and at the end dried by vapors of the solvent in order to obtain a fully clean upper surface of the glass substrate. Adequately shaped conductive segments, resistive segments and insulating segments are vacuum-deposited in several layers onto a so prepared support by using screening masks. Conductive segments are made by evaporation of e.g. gold, silver, or aluminum, resistive segments are of alloys of nickel and chromium, or, e.g., Si + Cr, Cr + CrO, $Al_2O_3$ + Au, and insulating layers principally of $SiO_2$.

According to the basic idea of present invention, the segments can, as already mentioned, be deposited by cathode-spraying or screen-printing in a known manner onto the polished surface of the glass substrate. Similarly, the insertion of the glass and leads, and the shape of substrates may experience certain variations so that e.g. wire leads can be sealed into a homogeneous glass substrate with the aid of adequately shaped jigs, the supporting metal frame becoming superfluous. The jigs may be of graphite or steel or of ceramics with particular coatings known per se, preventing adhesion of glass to the jigs.

In such a case, the ground lead becomes superfluous, or it obtains the electric connection with a metal layer deposited onto the edge of the glass substrate. In such a case, the metal can is sticked to the substrate with the aid of a conductive synthetic resin or glass solder, or it is soldered to the metallized edge of the glass substrate.

Likewise, the support according to the basic idea of the invention may have a rectangular shape and a great number of wire leads arbitrarily arranged.

I claim:

1. An electronic semiconductor device assembly comprising:
   - a homogeneous continuous nonporous vitreous body having an optically polished ground surface;
   - a plurality of leads embedded in said body in spaced-apart relationship with end portions terminating at said surface and being ground and optically polished flush with said surface;
   - an electronic semiconductor circuit element applied to said optically polished and ground surface and being in direct contact and in conductive relationship with said end portions of said leads; and
   - means fixed to said body and enclosing said optically polished and ground surface and said electronic semiconductor elements.

2. The electronic semiconductor device assembly defined in claim 1 wherein said body is composed of glass and said means includes a metal cylindrical frame surrounding said body and said optically polished and ground surface and being embedded in said body, and a metal cylindrical can bonded to said frame.

* * * * *